United States Patent
Cook et al.

(10) Patent No.: US 9,545,051 B2
(45) Date of Patent: Jan. 17, 2017

(54) SLOT DRIVEN LOW PROFILE SICKLE DRIVE

(75) Inventors: Joel T. Cook, Lititz, PA (US); Gary L. Bich, New Holland, PA (US); David M. DeChristopher, Ephrata, PA (US); Peter J. Ungs, Bolingbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 468 days.

(21) Appl. No.: 14/128,048

(22) PCT Filed: May 25, 2012

(86) PCT No.: PCT/US2012/039755
§ 371 (c)(1),
(2), (4) Date: Dec. 20, 2013

(87) PCT Pub. No.: WO2012/166675
PCT Pub. Date: Dec. 6, 2012

(65) Prior Publication Data
US 2014/0190139 A1    Jul. 10, 2014

Related U.S. Application Data

(60) Provisional application No. 61/490,983, filed on May 27, 2011.

(51) Int. Cl.
*A01D 34/04* (2006.01)
*A01D 34/30* (2006.01)
*A01D 34/14* (2006.01)

(52) U.S. Cl.
CPC ............ *A01D 34/04* (2013.01); *A01D 34/145* (2013.01); *A01D 34/30* (2013.01)

(58) Field of Classification Search
CPC ...... A01D 34/13; A01D 34/02; A01D 34/037; A01D 34/30; A01D 34/145; F16H 21/00; F16H 21/44
(Continued)

(56) References Cited

U.S. PATENT DOCUMENTS 795,078 A    7/1905 Vizard
966,046 A    8/1910 Noonan
(Continued)

FOREIGN PATENT DOCUMENTS

DE    4319409 A1 *  3/1994  ............. A01D 34/08
FR       924270 A      7/1947
(Continued)

*Primary Examiner* — John G Weiss
(74) *Attorney, Agent, or Firm* — Peter K. Zacharias; Patrick M. Sheldrake (57) ABSTRACT

A slot driven low profile sickle drive has an input rotatable about an upstanding rotational axis and carries an eccentric captured in a slot in one end of a pivot arm pivotable about an upstanding pivotal axis. A power source is connected in rotatably driving relation to the input. The opposite end of the pivot arm connects to a knife assembly of a sickle. The input, eccentric and pivot arm are generally flat, and the power source is vertically coextensive therewith for incorporation in or below the floor of a header of a plant cutting machine. Rotation of the input causes epicyclical orbiting of the eccentric, resulting in sideward pivoting of the opposite end of the pivot arm and sickle knife. A second drive can oppositely drive a second sickle knife, such that opposite forces generated by operation of the drives will be largely canceled.

16 Claims, 9 Drawing Sheets

(58) Field of Classification Search
USPC .......... 56/158, 296, 12.6, 17.6, 297; 74/595, 74/22 A, 25, 55
See application file for complete search history.

(56) References Cited

U.S. PATENT DOCUMENTS

| | | | |
|---|---|---|---|
| 1,000,393 A | | 8/1911 | Felker |
| 1,511,501 A | | 10/1924 | Campbell |
| 2,770,089 A | | 11/1956 | Fenerlein |
| 2,787,111 A | | 4/1957 | Templeton |
| 2,994,175 A | | 8/1961 | Williams |
| 3,246,461 A | | 4/1966 | Wood |
| 3,517,494 A | * | 6/1970 | Beusink ................. A01D 34/30 56/293 |
| 3,561,200 A | * | 2/1971 | Minunno ............... A01D 34/02 56/14.7 |
| 3,897,630 A | | 8/1975 | Glover et al. |
| 3,973,378 A | | 8/1976 | Bartasevich et al. |
| 4,866,921 A | | 9/1989 | Nagashima et al. |
| 4,909,025 A | * | 3/1990 | Reissig ................. A01D 34/305 56/257 |
| 5,083,376 A | | 1/1992 | Lentino |
| 7,401,458 B2 | | 7/2008 | Priepke |
| 7,520,118 B1 | | 4/2009 | Priepke |
| 7,730,709 B2 | | 6/2010 | Priepke |
| 7,805,919 B2 | | 10/2010 | Priepke |
| 7,810,304 B2 | | 10/2010 | Priepke |
| 8,011,272 B1 | | 9/2011 | Bich |
| 8,151,547 B2 | | 4/2012 | Bich et al. |
| 2011/0099964 A1 | * | 5/2011 | Coers ..................... A01D 34/30 56/296 |

FOREIGN PATENT DOCUMENTS

| | | | | |
|---|---|---|---|---|
| FR | 2046614 | * | 1/1997 | |
| GB | 348263 | | 5/1931 | |
| IT | DE 19524039 A1 | * | 1/1997 | ............. A01D 34/30 |
| JP | 3-22909 | | 1/1991 | |
| JP | H0513137 A | | 1/1993 | |
| JP | 7-194223 | | 8/1995 | |
| JP | 2010198753 A | | 9/2010 | |

* cited by examiner

Fig. 9C  Fig. 9D

SLOT DRIVEN LOW PROFILE SICKLE DRIVE

This application is the US National Stage for International Application No. PCT/US12/39755, filed on May 25, 2012, which itself is related to and claims the benefit of U.S. Provisional Application No. 61/490,983 filed May 27, 2011.

TECHNICAL FIELD

This invention relates generally to a drive for the sickle of a header of an agricultural cutting machine, such as a combine, windrower or other crop harvesting machine, or a mower, and more particularly, to a drive mechanism that can be configured to have only a slot driven pivoting shaft extending upwardly from an upper enclosure thereof for connection to a knife head, and which, including the power source, is configured to have an overall profile shape when viewed from the side that tapers convergingly toward a forward end thereof, so as to be adapted to be disposed in or below a floor or pan of the header, to reduce interference with plant material flow.

BACKGROUND ART

The disclosure of U.S. Provisional Application No. 61/490,983, filed May 27, 2011, is hereby incorporated herein in its entirety by reference.

Sickles typically including cutter bars supporting a row of knives, have been used to cut plants, including, but not limited to, hay, grasses, small grains and the like, for many years. The knives are composed of a plurality of knife or sickle sections which are mounted in side by side relation forming an elongate metal knife assembly. The elongate knife assembly is normally supported so as to slide longitudinally along an elongate stationary bar that has forwardly projecting, spaced apart guards bolted to a structural beam. The knife assembly moves back and forth in a reciprocating movement to move the knives relative to the guards so that the leading knife edges of the knives cross over the guards or through slots in the guards. This produces a shearing or cutting action which severs plant stems and stalks or other material captured between the knives and the guards.

In a harvesting machine, such as a combine or windrower, the knife assembly and stationary bar are typically supported in connection with a cutting head or header, and are oriented so as to extend sidewardly along a forward edge portion of structure such as a floor or pan of the header, hereinafter sometimes referred to generally as the floor. The floor or pan defines the lower periphery of a cut crop or plant flow area, which can include conveying apparatus, such as one or more augers or belts, operable in cooperation with a reel in machines so equipped, for conveying the cut plant material and crops, for instance, to a feeder inlet of a combine or windrow forming apparatus of a windrower.

The knife assembly is driven reciprocatingly longitudinally by an oscillating drive, which can include, but is not limited to, an eccentric shaft on a rotating hub, a wobble drive, or a similar well known commercially available device. Such drives are typically located at the sides of the header, so as to drive the knife assembly from the end. This location is advantageous as it allows the driving point for the knife assembly to be in line with the stationary bar, provides clearances for removal of the knife assembly, and provides space for assembly of the drive. Disadvantages of the side location include that the header must include significant frame structure for supporting the drive and to withstand forces and vibrations generated thereby. The end structure or crop divider at the end of the header must also be relatively wide, to accommodate the drive and to direct adjacent standing crops therepast, and increasing the possibility of accidentally pushing down adjacent standing crops. Additionally, for headers utilizing two drives located on opposite sides of the header, it is usually desired to time the operation of the drives such that the forces and vibrations generated by the respective drives cancel one another. This typically involves relatively long mechanical drive lines connecting the two drives together, which is disadvantageous as it adds weight, cost and complexity.

A knife assembly, which will weigh from 35 to 38 pounds for a typical 20 foot wide header, typically must accelerate and decelerate two times per cycle as a result of the reciprocating movement. A typical speed for the knife assembly is up to about 16 hertz or cycles per second. Thus, it can be seen, the reciprocating motion at a high cycle per second generates high acceleration values and high deceleration values that in turn generate high forces on the structural components. These high forces can have at least two negative effects, vibration at the drive system that may be transmitted to other components of the machine, and fatigue failure of the structural components themselves. On larger headers, for instance, headers 30 feet wide and greater, two knife assemblies each equal to one-half the sideward extent of the header are often used.

Driving a knife assembly or assemblies of a header from a more central location, such as the center of the header, would provide several advantages compared to a side location. Notably among these advantages, the header structure would not be required to support heavy drive units on one or both sides, such that the structure of the header could be lighter. Long timing apparatus extending between the ends could also be eliminated. If the drive mechanism could be incorporated into a location that would not interrupt or require dividing crop or plant material flow through the crop flow area of the header, the normal crop flow of the header would not be significantly impacted. And, since the drives are not located in the ends, the end dividers can be made significantly thinner, such that the header can have a shorter overall width, would be more easily maneuverable in relation to adjacent standing crop, and danger of downing the adjacent standing crop would be reduced.

Reference Priepke U.S. Pat. Nos. 7,810,304; 7,805,919; 7,730,709; 7,520,118; and 7,401,458, and Bich et al. U.S. Pat. No. 8,011,272, which demonstrate that a sickle drive or drives can be incorporated in or below the header floor to solve one or more of the problems set forth above in regard to end mounted drives and interruption of plant material flow in the crop flow area of the header.

What is sought is a sickle drive adapted to be incorporated into or below the floor of a header of a plant cutting or harvester to reduce interruption and splitting of plant material flow, and which overcomes one or more of the shortcomings and limitations set forth above.

SUMMARY OF THE INVENTION

What is disclosed is a sickle drive adapted to be incorporated into or below the floor of a header of a plant cutting or harvester to reduce interruption and splitting of plant material flow, and which overcomes one or more of the shortcomings and limitations set forth above.

According to a preferred aspect of the invention, the drive includes a generally flat enclosure having a forward end and bounding and defining a cavity. The drive is preferably configured as an epicyclic slot driven arrangement, including a rotatable, substantially flat first input element supported in the cavity for rotation about a generally upstanding first rotational axis. A substantially flat first eccentric element is supported in the cavity in connection with the first input element for rotation thereby in eccentric relation to the rotational axis about a generally upstanding first eccentric axis laterally offset relative to the first rotational axis. A first pivot arm has a substantially flat first end disposed in the cavity, an opposite upwardly extending second end projecting from the cavity and configured for connection to a knife assembly of a sickle located forwardly thereof, and a first pivot shaft supporting the first pivot arm for pivotal movement about an upstanding first pivotal axis. The first end of the first pivot arm includes a slot cooperatively receiving the eccentric element, such that eccentric rotation of the first eccentric element about the first rotational axis will reciprocatingly pivot the first pivot arm. The drive includes a power source substantially vertically coextensive therewith, connected in rotatably driving relation to the first input element.

According to another preferred aspect of the invention, the flat profile of the drive adapts it to be unobtrusively positioned below or in the front region of the floor of a header, to allow relatively unhindered plant material flow thereover.

According to still another preferred aspect of the invention, the drive includes a rotatable, substantially flat second input element supported in the cavity preferably beside the first input element for rotation about a generally upstanding second rotational axis. A substantially flat second eccentric element is supported in the cavity in connection with the second input element for rotation thereby in eccentric relation to the second rotational axis about a generally upstanding second eccentric axis laterally offset relative to the second rotational axis. A second pivot arm having a substantially flat first end is disposed in the cavity, and has an opposite upwardly extending second end projecting from the cavity and configured for connection to a second knife assembly of the sickle. A second pivot shaft supports the second pivot arm for pivotal movement about an upstanding second pivotal axis, the first end of the second pivot arm including a slot cooperatively receiving the second eccentric element, such that eccentric rotation of the second eccentric element about the second rotational axis will reciprocatingly pivot the second pivot arm sidewardly.

As another preferred aspect of the invention, the power source is connected in rotatably driving relation to the second input element in a manner to cause sideward pivotal movement of the second pivot arm opposite that of the first pivot arm, such that the first and second sickle knife assemblies will be moved sidewardly simultaneously in opposite directions. This is advantageous as opposite forces generated by the operation of the drive will at least largely cancel each other. As a further preferred aspect of the invention, the power source can comprise, for instance, a fluid or electric motor, drive shaft, belt drive, chain drive, or the like.

The enclosure can fully contain the drive or drives, for instance, by including full upper and lower covers, or it can partially enclose the drive or drives, such that all or a portion of any of the elements are exposed. For instance, as a non-limiting example, the enclosure can include or be incorporated in or below the floor of a header of a plant cutting machine which will serve as a cover, with all or a portion of a bottom region of the drive or drives, or elements thereof, exposed to the ground below, essentially the frame of the header then generally defining the lower bounds of the cavity.

DETAILED DESCRIPTION OF THE INVENTION

Turning now to the drawings wherein a preferred embodiment of the invention is shown, in FIGS. 1 through 5, a conventional, well known agricultural cutting machine, which is a combine 20, is shown including a header 22 incorporating slot driven low profile sickle drives 62A and 62B of the invention as will be explained. Header 22 is shown supported in the conventional, well-known manner on a forward end 24 of combine 20, and is operable for cutting or severing crops such as, but not limited to, small grains such as wheat and soybeans, and inducting the severed crops into a feeder 26 for conveyance into combine 20 for threshing and cleaning, in the well known manner, as combine 20 moves forwardly over a field.

Header 22 includes a pan or floor 28 which is supported in desired proximity to the surface of the field during the harvesting operation, and an elongate, sidewardly extending sickle 30 along a forward edge portion 32 of floor 28, sickle 30 being operable for severing the plants or crop for induction into header 22, as will be explained. Header 22 additionally includes an elongate, sidewardly extending reel 34 disposed above sickle 30 and rotatable in a direction for facilitating induction of the severed plant material or crops into header 22. Here, header 22 is configured as a draper type, having a system of elongate, flat, sidewardly moving draper belts 36 and 38 having upwardly facing surfaces disposed just rearwardly of forward edge portion 32, operable in cooperation with reel 34 for conveying the severed plant material or crops toward an inlet opening of feeder 26 for induction into combine 20, in the well-known manner.

Figure 1:
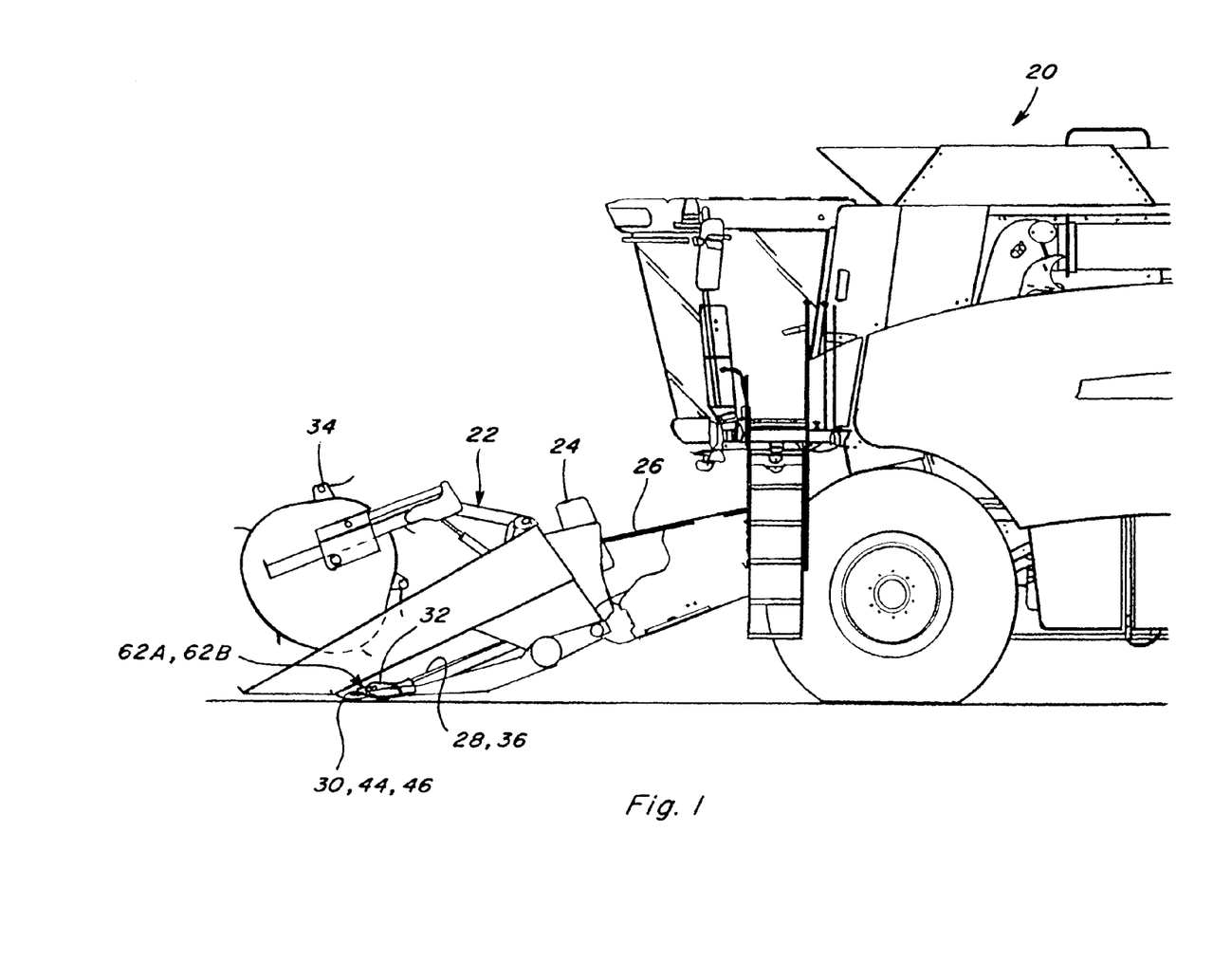
FIG. 1 is a fragmentary side view of a harvester including a header having slot driven low profile sickle drives according to the invention.
Figure 2:
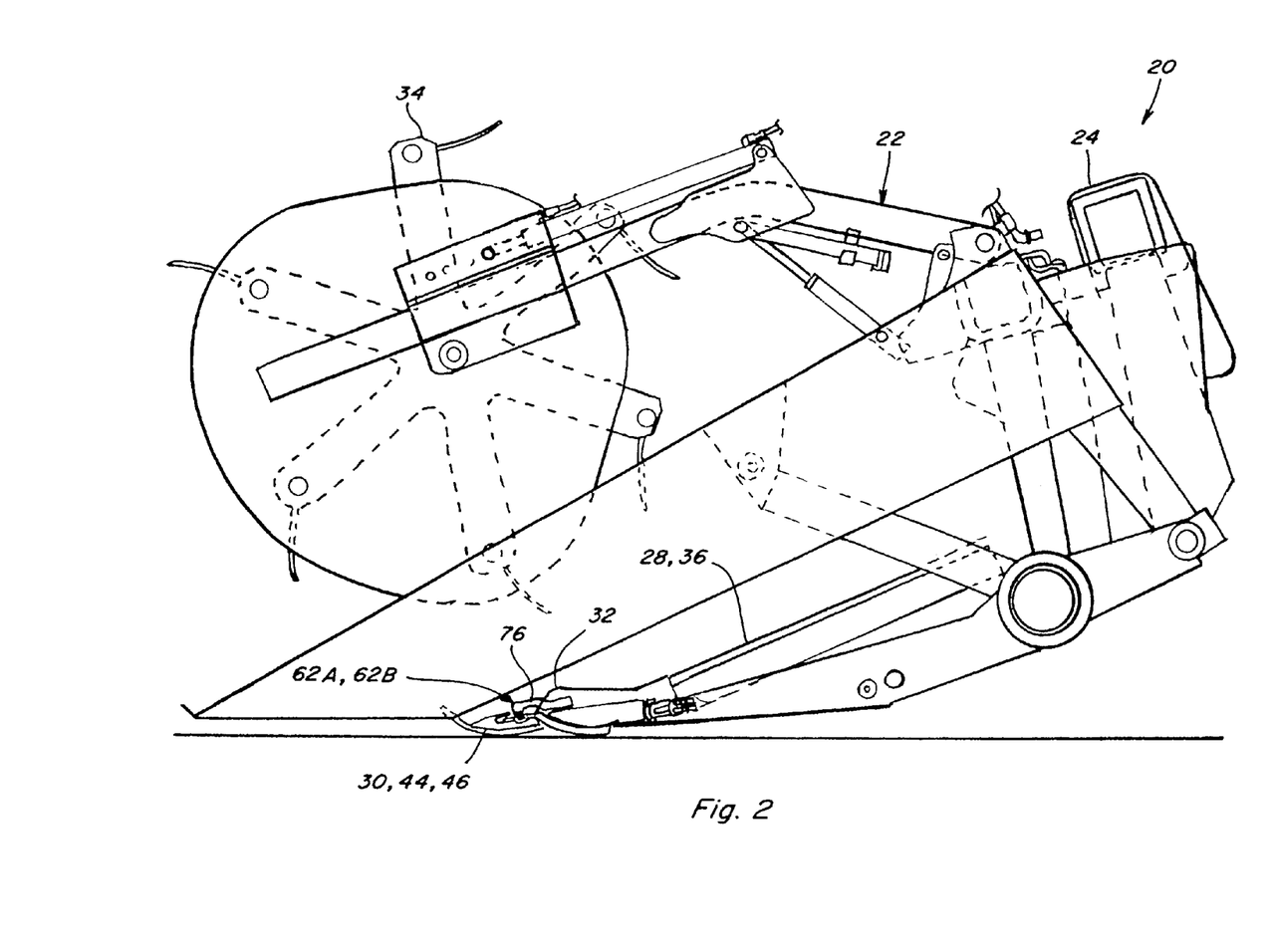
FIG. 2 is an enlarged fragmentary side view of the header and sickle drives of the invention.
Figure 3:
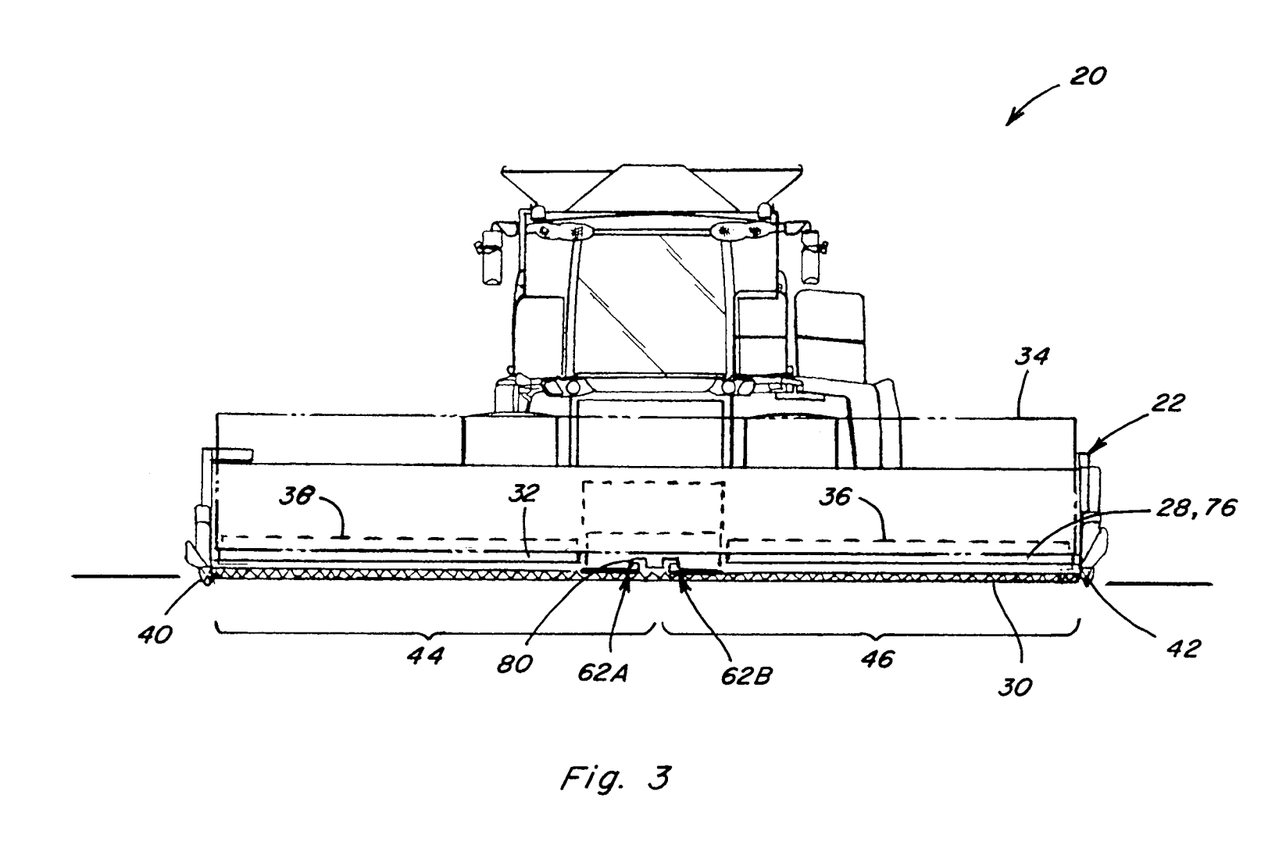
FIG. 3 is a front view of the harvester and header, showing the location of the sickle drives.

Referring more particularly to FIG. 3, sickle 30 extends in a sideward direction along the width of floor 28, between a first side edge portion 40 of the floor, and an opposite second side edge portion 42. Sickle 30 includes an elongate, sidewardly extending first cutter bar assembly 44, and an elongate, sidewardly extending second cutter bar assembly 46 extending in end to end relation to cutter bar assembly 44, cutter bar assemblies 44 and 46 being supported in substantially longitudinally aligned relation adjacent to forward edge portion 32 of floor 28.

Figure 4:
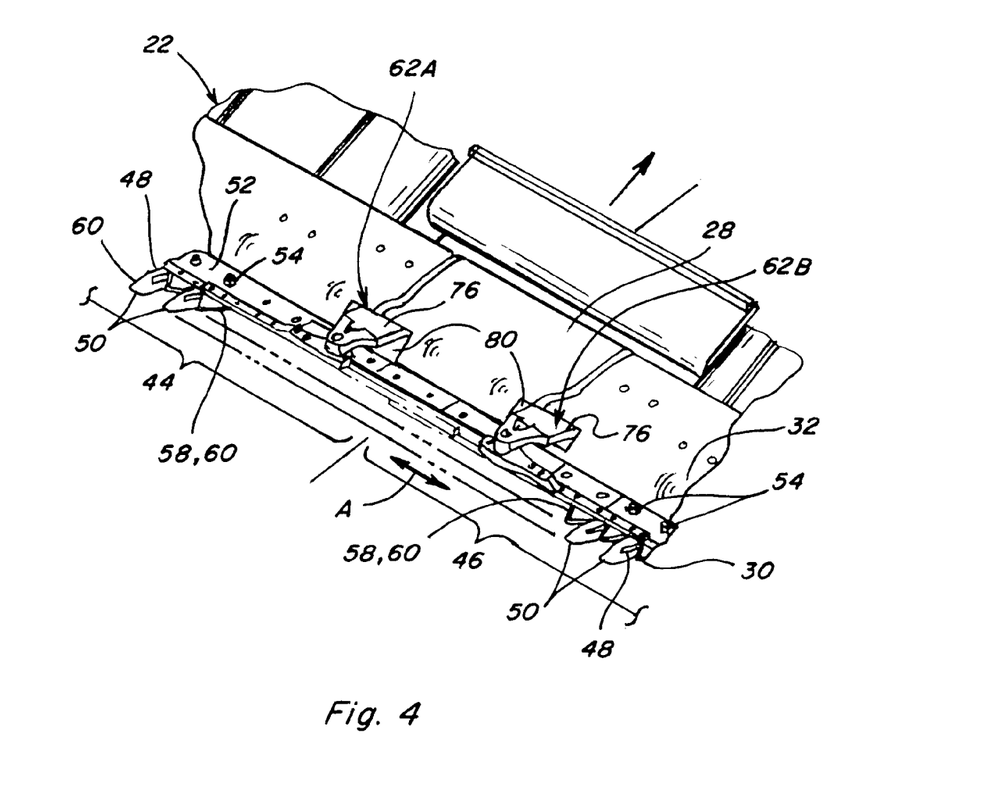
FIG. 4 is a fragmentary perspective view of the header, showing aspects of the sickle drives.
Figure 5:
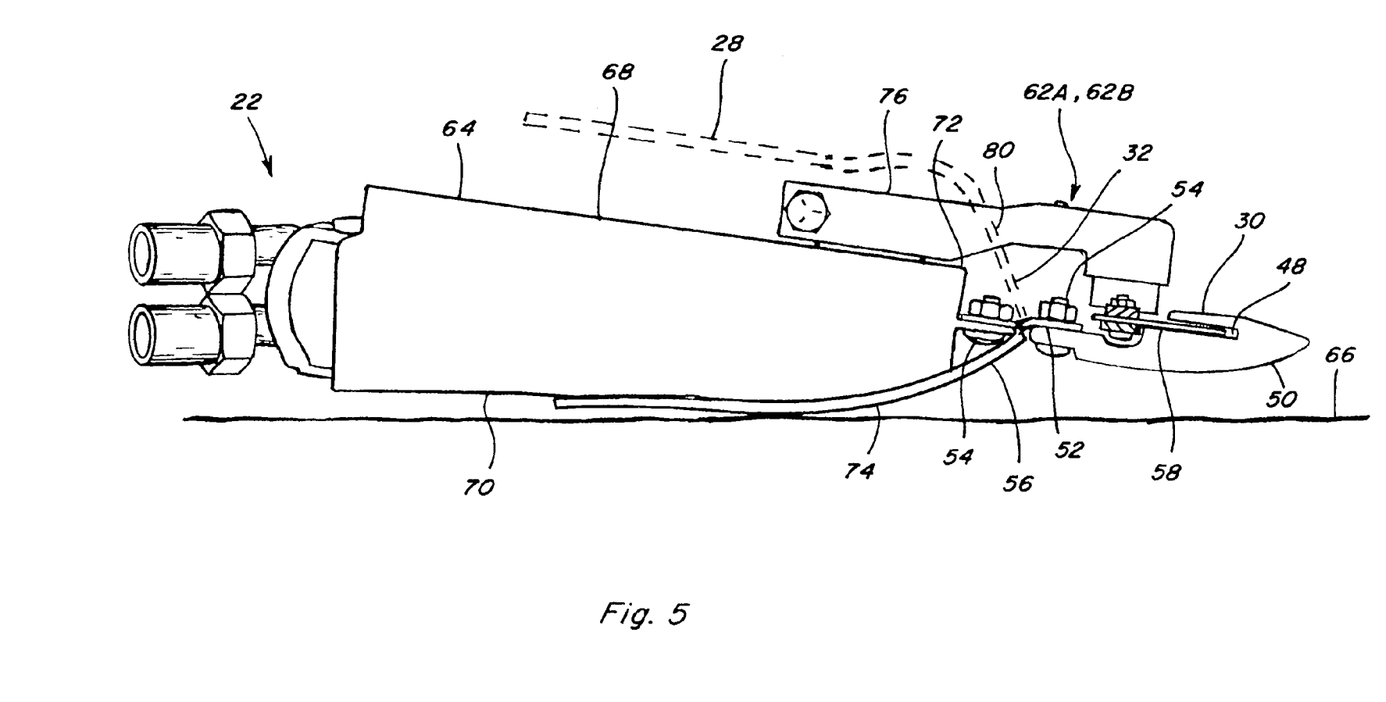
FIG. 5 is an enlarged side view showing aspects of the header, drives, and sickle.

Referring more particularly to FIGS. 4 and 5, cutter bar assemblies 44 and 46 each include a plurality of sidewardly facing aligned slots 48 through a sidewardly extending array of guards 50 which project forwardly from a stationary bar 52 at sidewardly spaced intervals therealong. Stationary bar 52 extends the length of sickle 30 just forwardly of forward edge portion 32 of floor 28, and guards 50 are mounted to bar 52 with fasteners 54. Bar 52, in turn, is mounted to a frame 56 of header 22 adjacent to forward edge portion 32 by fasteners 54, as best illustrated in FIG. 5. Each of cutter bar assemblies 44 and 46 supports an elongate knife assembly 58 for reciprocating longitudinal movement within slots 48, each knife assembly 58 including a row of knife sections including oppositely facing, angularly related knife edges 60 which, in conjunction with adjacent guards 50, effects a shearing or cutting action which severs plant stems and stalks or other material captured between the knives and the guards as the knife sections are reciprocatingly moved sidewardly, as denoted by arrow A in FIG. 4.

As noted above under the Background Art heading, it is desirable to reduce negative effects of the reciprocating sideward motion of knife assemblies 58, including, but not limited to, vibration, fatigue failure, and the like, and also the disadvantages of known structures for effecting the motion, including the need for substantial structure for supporting drive mechanisms on the sides of headers, the increased width of side dividers containing the mechanism, and apparatus for timing drive mechanisms located on opposite sides of a header.

Reduction of these negative effects and disadvantages is achieved according to the present invention by utilizing first and second slot driven low profile sickle drives 62A and 62B constructed and operable according to the teachings of the present invention, for reciprocatingly driving the respective knife assemblies 58. First and second sickle drives 62A and 62B are illustrated in FIG. 3 at a center location on header 22 between side edge portions 40 and 42, although it should be noted that it is contemplated that sickle drives 62A and 62B could alternatively be utilized at other locations on a header, and that multiple sickle drives 62 could be used at multiple locations on a header, as described and illustrated later herein.

First and second sickle drives 62A and 62B are packaged together in a low profile common enclosure 64. Enclosure 64 is configured so as to be integrated into or beneath floor 28 of header 22, in, or just rearward of, forward edge portion 32, as best shown in FIGS. 4 and 5, to facilitate both smooth flow of crop or plant material thereover, and also smooth passage over the ground surface 66 therebelow. In this latter capacity, it can be observed that enclosure 64 is desirably configured to have a tapered profile shape when viewed from the side, preferably including an upper cover 68, and a lower cover 70 to allow disassembly, and which extend generally convergingly toward a forward end 72 of the enclosure. Also preferably, the forward end of lower cover 70 will have an upwardly curving shape, to guide and facilitate the smooth passage over the ground surface and flow of plant material thereabout. It can be observed that forward edge portion 32 of floor 28 has an upwardly curved shape, which combined with the upwardly tapered or curved forward end of enclosure 64, provides header 22 with an overall wedge shaped leading edge profile, which again, facilitates the smooth flow over the ground and of plant material over the front edge of the header. Enclosure 64 can be mounted in any suitable manner, such as by attachment with fasteners to frame or structural elements of header 22.

As shown, upper cover 68 of enclosure 64 is located below forward edge portion 32 of floor 28, which can comprise sheet metal or other suitable material, such that cut plant material will flow over the enclosure without contacting it. Alternatively, upper cover 68 can be integrated into floor 28. Enclosure 64 will be of cast and/or machined metal construction such as steel or aluminum, and upper and lower covers 68 and 70 can be joined together with suitable fasteners, as illustrated in subsequent figures. A skid plate 74 can be disposed below at least the forward end, for protection from wear and contact with hard objects such as rocks and the like that may be encountered during operation.

Each of first and second sickle drives 62A and 62B includes a knife arm 76 atop upper surface 68 of enclosure 64 and extending forwardly therefrom. Knife arms 76 pivotally connect to the knife assemblies 58, respectively, and are movable by the respective drive 62A or 62B in a sideward pivoting action that will translate via a pivoting relationship into the above described sideward reciprocating movement, as restrained by the guards 50. Knife arms 76 are the only upwardly externally protruding elements of first and second drives 62A and 62B, the other elements being located within an internal cavity 78 of enclosure 64. Knife arms 76 project forwardly through slots 80 in forward edge portion 32, to minimize interruption of the plant material flow.

Figure 6:
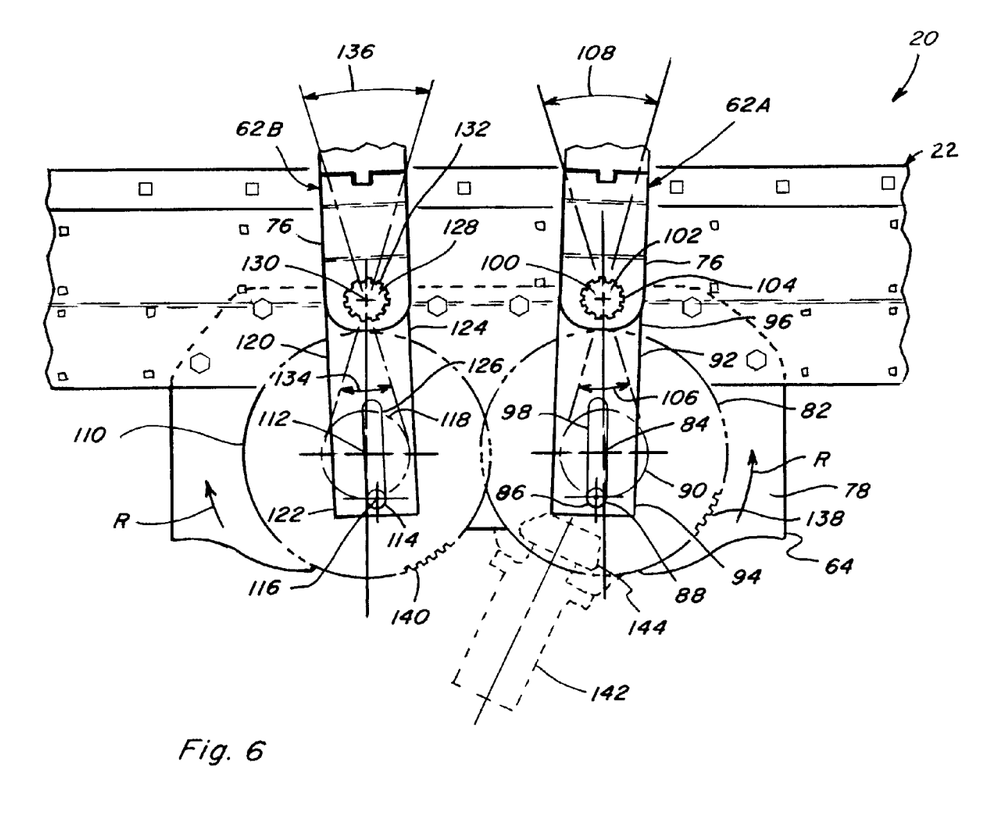
FIG. 6 is a simplified schematic top view of the drives, illustrating internal elements thereof.
Figure 7:
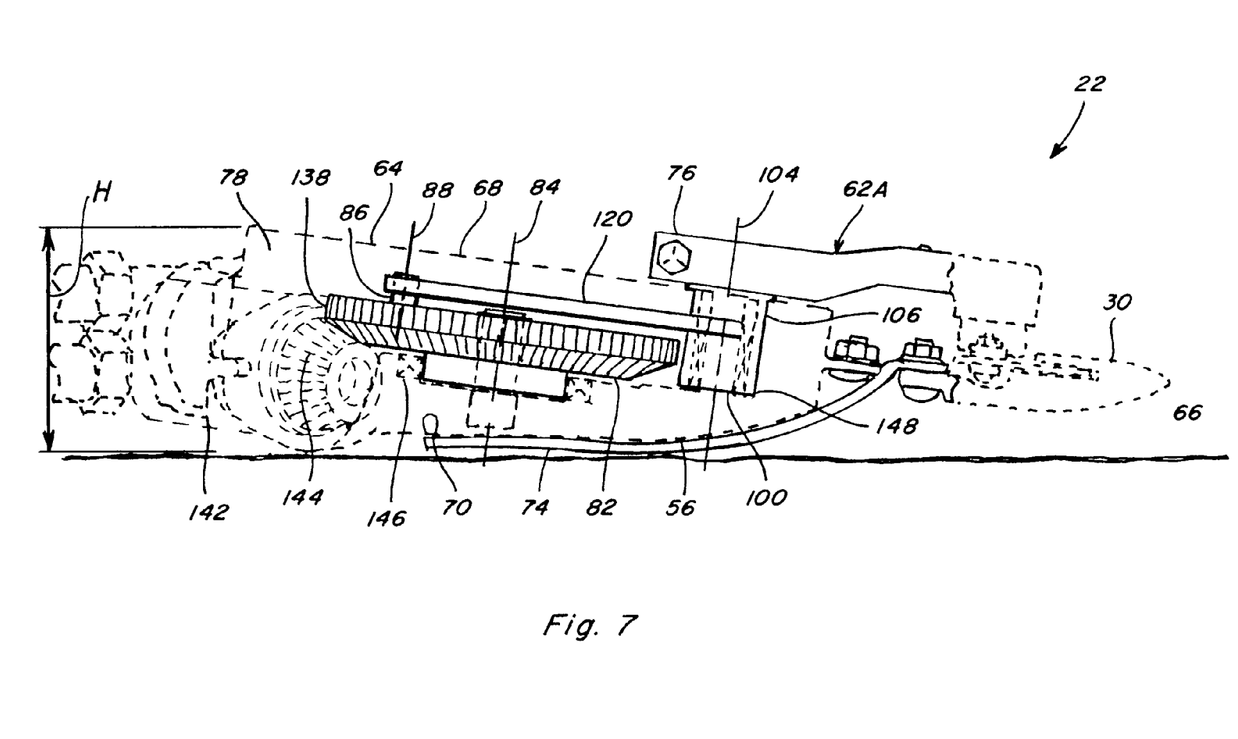
FIG. 7 is a simplified schematic side view of one of the drives.
Figure 8:
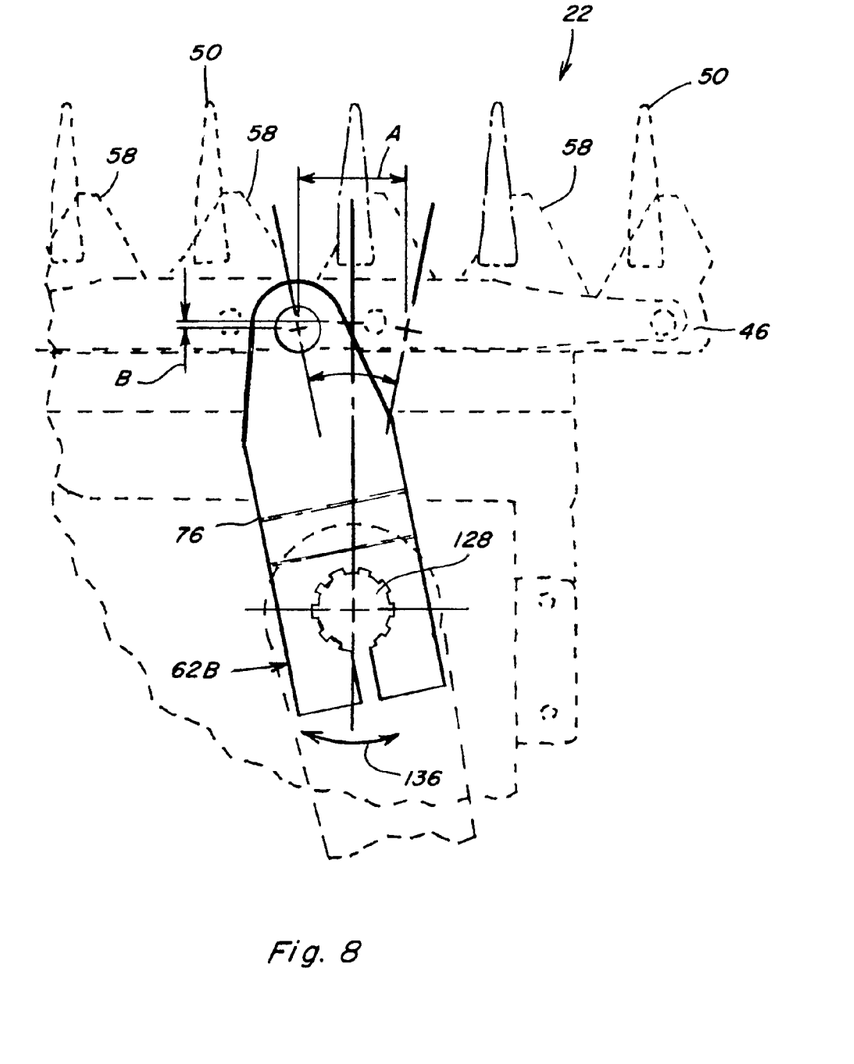
FIG. 8 is a simplified schematic partial top view of the header and one of the drives, illustrating operating positions thereof.
Figure 9A:
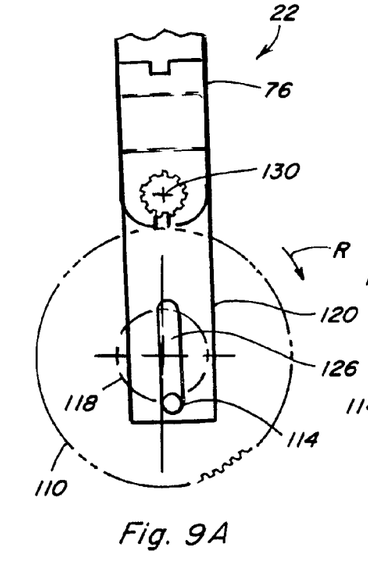
FIG. 9A is a simplified schematic top view of elements of one of the drives illustrating a pivotal position thereof.
Figure 9B:
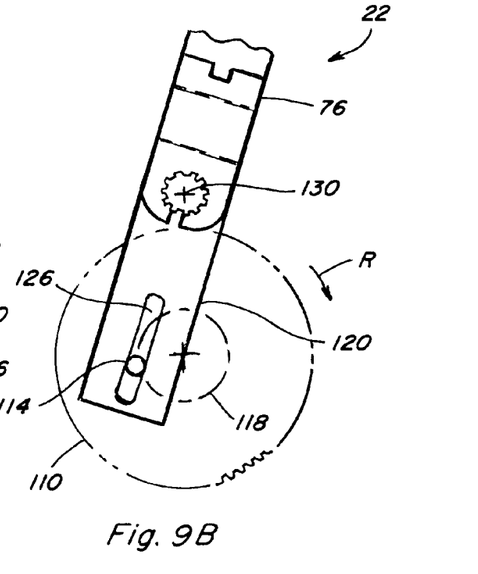
FIG. 9B is a simplified schematic top view of the elements of one of the drives illustrating another pivotal position thereof.
Figure 9C:
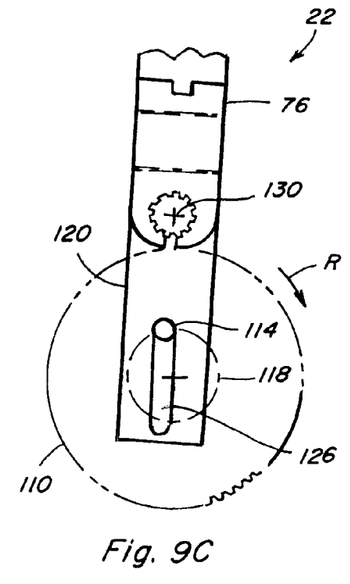
FIG. 9C is another simplified schematic top view of the elements of one of the drives illustrating another pivotal position thereof.
Figure 9D:
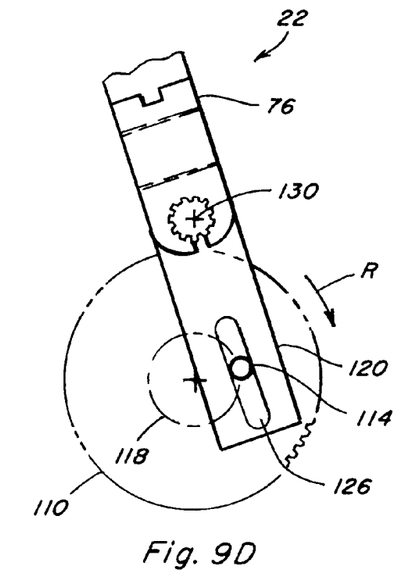
FIG. 9D is another simplified schematic top view of elements of one of the drives illustrating still another pivotal position thereof.

Referring also to FIGS. 6, 7, and 8, the internal elements of first and second drives 62A and 62B other than knife arms 76 are disposed in side by side relation in an internal cavity 78 of enclosure 64. First and second drives 62A and 62B are each configured as an epicyclic slot driven arrangement, including a central rotatable input element, an eccentric element rotatable along an epicyclical orbit about the rotatable input element, and a pivoting pivot arm moved by the eccentric element to pivot the knife arm side to side. More particularly, first drive 62A includes a rotatable first input element 82 supported in an upper region of cavity 78 for rotation about a generally upstanding first rotational axis 84. Drive 62A includes a first eccentric element 86 supported in cavity 78 above first input element 82 for rotation thereby in eccentric relation to first rotational axis 84 about a generally upstanding first eccentric axis 88 laterally offset relative to rotational axis 84, such that eccentric element 86 will follow an epicyclical path 90 about rotational axis 84. Drive 62A includes a first pivot arm 92 disposed in cavity 78, having a first end 94 and an opposite second end 96. First end 94 includes an elongate slot 98 therein which cooperatively receives all or a portion of eccentric element 86 for longitudinal movement therealong, as eccentric element 86 follows epicyclical path 90 about first rotational axis 84. First pivot arm 92 is oriented to extend forwardly from first end 94 to second end 96. Second end 96 includes an upwardly extending pivot shaft 100 supported for rotation about a generally upstanding first pivotal axis 104 therethrough. Pivot shaft 100 extends upwardly through an aperture 104 through upper cover 68 of enclosure 64 and fixedly connects to a knife arm 76, e.g., via a splined connection or the like.

In operation, rotation of first input element 82 will cause first eccentric element 86 to orbit eccentrically along epicyclical path 90. First pivot arm 92, because it has a fixed length and receives eccentric element 86 in slot 98 on one end and the other end is restrained to rotate only about pivotal axis 104, and thus can only pivot side to side about axis 104 in a limited manner, about an arcuate path 106. Because knife arm 76 is fixedly connected to the upper end of pivot shaft 100, it will be limited in movement to an arcuate path 108, as shown in FIGS. 6, 8, 9 and 10. Additionally, because the opposite end of knife arm 76 is connected to a knife assembly 58, knife assembly 58 will be reciprocatingly moved sidewardly an amount A (FIGS. 4 and 8) relative to guards 50, to effect the plant cutting action. In this regard, the connection of knife arm 76 to knife assembly 58 is preferably a pinned connection such that knife assembly 58, or that portion thereof in proximity to knife arm 76, will also move along the pivotal path, such that some limited fore and aft movement of the knife assembly will occur, as denoted by distance B in FIG. 8. The relationship between the guards and knife assembly can be configured to allow this. Alternatively, the connection between the knife head and knife assembly can be configured, e.g., slotted connection, to allow some limited fore and aft relative movement, such that the knife assembly only moves sidewardly.

Second drive 62B includes a rotatable second input element 110 supported in an upper region of cavity 78 for rotation about a generally upstanding second rotational axis 112, beside first input element 82. Drive 62B includes a second eccentric element 114 supported in cavity 78 above second input element 110 for rotation thereby in eccentric relation to second rotational axis 112 about a generally upstanding second eccentric axis 116 laterally offset relative to rotational axis 112, such that eccentric element 114 will follow an epicyclical orbital path 118 about rotational axis 112, as shown in FIG. 6. Drive 62B includes a second pivot arm 120 disposed in cavity 78, having a first end 122 and an opposite second end 124. First end 122 includes an elongate slot 126 therein which cooperatively receives all or a portion of eccentric element 114 for longitudinal movement therealong, as eccentric element 114 follows epicyclical path 118 about second rotational axis 112. Second pivot arm 120 is oriented to extend forwardly from first end 122 to second end 124. Second end 124 includes an upwardly extending pivot shaft 128 supported for rotation about a generally upstanding second pivotal axis 130 therethrough. Pivot shaft 128 extends upwardly through an aperture 132 through upper cover 68 of enclosure 64 and fixedly connects to a knife arm 76, again, e.g., via a splined connection or the like.

Referring also to FIGS. 9A-D, in operation, rotation of second input element 110 as denoted by arrow R will cause second eccentric element 114 to orbit eccentrically along epicyclical path 118. Second pivot arm 120, because it has a fixed length and receives eccentric element 114 in slot 126 on one end and the other end is restrained to rotate only about pivotal axis 130, and thus can only pivot side to side about axis 130 in a limited manner, about an arcuate path 134 (FIG. 6). Because knife arm 76 is fixed thereto, it will follow a corresponding arcuate path 136 as also illustrated in FIG. 6.

It is desired to reciprocatingly move the two knife assemblies 58 simultaneously in opposite sideward directions, as illustrated in FIG. 6, although that is not necessary. To achieve this, first and second drives 62A and 62B are preferably operated in opposite direction, in timed relation. This is preferably accomplished by jointly driving the drives in opposite rotational directions. In the preferred configuration shown, first and second input elements 82 and 110 are connected together via enmeshed gears 138 and 140 which extend therearound, respectively, as shown in FIG. 6. Alternatively, input elements 82 and 110 could be connected together by a cogged belt, a timing shaft, or the like, and the eccentric axes 88 and 116 offset to provide opposite directional movements of pivot arms 92 and 120.

To rotate input elements 82 and 110, a rotatable power source 142 is provided, which is preferably an electric or fluid motor, connected in driving relation to one of the input elements 82 or 110 via a bevel gear arrangement 144 or the like. Alternatively, the power source could comprise a shaft, chain or belt drive, as desired. Here, power source 142 is mounted to housing 64 at an acute angle to the forward direction. This enables accommodating power source 142 in a manner to provide a shorter overall fore and aft extent of the drives.

As a feature of the invention, to provide a relatively thin, flat overall package, input elements 82 and 110, eccentric elements 86 and 114, and pivot arms 92 and 120 of drives 62A and 62B are each relatively flat, and the eccentric elements and drive arms are substantially vertically coextensive, to provide vertical compactness, such that drives 62A and 62B are adapted to be unobtrusively positioned below or in the front region of floor 28 of a header, such as header 22, to allow relatively unhindered plant material flow thereover. In this regard, input elements 82 and 110 are each preferably disk or platter shaped elements supported for rotation about axes 84 and 112, respectively by suitable bearings 146. This configuration provides input elements 82 and 110 mass to serve as flywheels for the drives. Also, input elements 82 and 110 overlap portions of pivot arms 92 and 120, respectively, to facilitate fore and aft compactness.

Eccentric elements 86 and 114 are fixedly connected to the respective input elements 82 and 110 for rotation therewith, and can comprise pins or shafts, and optionally including bushings or bearings (not shown) at the interface with pivot arms 92 and 120 for reducing friction and wear. Pivot arms 92 and 120 are mounted using bearings or bushings 148 for rotation thereabout.

As an advantage, because the two drives are oppositely moving, external forces and resulting vibrations generated by the drives in both the sideward and fore and aft directions, are largely canceled. As another advantage, the configuration of drives 62A and 62B, and packaging in a single enclosure 64, allows pivot shafts 100 and 128 to be of relatively large diameter, so as to be robust and strong.

As yet another advantage, it can be observed that the sickle drive, including the enclosure and rotatable power source, can have an overall vertical extent or height H (FIG. 7) that facilitates placement in or below the floor of a header of a plant cutting machine, such that only the knife arms protrude upwardly from the floor. In this regard, it should be recognized that it is contemplated according to the invention that other arrangements of the drives can be employed, such as fore and aft arrangement of the companion drives, and pivot arms that extend in other directions for connection to the knife assemblies. The internal arrangement of components can also be vertically reversed, such that the input elements are at the bottom.

In light of all the foregoing, it should thus be apparent to those skilled in the art that there has been shown and described a slot driven low profile sickle drive. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A sickle drive for a plant cutting machine comprising:
a first sickle knife assembly supported for side to side reciprocating movement along a forward end of the machine,
a rotary power source that drives the sickle knife assembly,
a generally flat cover bounding and defining an upper portion of a generally flat cavity containing a substantially flat first input element supported for rotation about a generally upstanding first rotational axis, and a rotatable, substantially flat second input element supported in the cavity adjacent to the first input element for rotation about a generally upstanding second rotational axis, wherein the first and second input elements are connected so as to be rotated in opposite directions by the rotary power source, and wherein the rotary power source engages an under surface of one of the first and second input elements,
a substantially flat first eccentric element supported in the cavity in connection with the first input element for rotation thereby in eccentric relation to the rotational axis about a generally upstanding first eccentric axis laterally offset relative to the first rotational axis,
a substantially flat second eccentric element supported in the cavity in connection with the second input element for rotation thereby in eccentric relation to the second rotational axis about a generally upstanding second eccentric axis laterally offset relative to the second rotational axis,
a first pivot arm having a substantially flat first end and an opposite upwardly extending second end projecting upwardly from the cavity and configured for connection to the first knife assembly of a sickle located forwardly thereof, and the first pivot arm supported for pivotal movement about an upstanding first pivotal axis, the first end of the first pivot arm including a slot cooperatively receiving the first eccentric element, such that eccentric rotation of the first eccentric element about the first rotational axis will reciprocatingly pivot the first pivot arm, and
a second pivot arm having a substantially flat first end and an opposite upwardly extending second end projecting upwardly from the cavity and configured for connection to a second knife assembly of the sickle located forwardly thereof, and the second pivot arm being supported for pivotal movement about an upstanding second pivotal axis, the first end of the second pivot arm including a slot cooperatively receiving the second eccentric element, such that eccentric rotation of the second eccentric element about the second rotational axis will reciprocatingly pivot the second pivot arm.

2. The sickle drive of claim 1, wherein the second end of the first pivot arm comprises a pivot shaft.

3. The sickle drive of claim 2, wherein the first input element is disk shaped and the first end of the first pivot arm is disposed above a forward portion thereof and extends forwardly to the pivot shaft.

4. The sickle drive of claim 3, wherein the cover is part of an enclosure having an overall vertical extent, and the rotary power source is disposed adjacent to a rear end thereof and has a vertical extent less than the overall vertical extent, so as to follow unobtrusively in a path of the enclosure when the drive is moved forwardly.

5. The sickle drive of claim 4, wherein the power source comprises a motor.

6. The sickle drive of claim 5, wherein the motor is a fluid motor or an electric motor.

7. A sickle drive comprising:
a generally flat enclosure having an upper cover with a forward end disposed just rearwardly of a sidewardly extending sickle of a header of an agricultural plant cutting machine, and a lower cover having a forward end which tapers or curves upwardly toward the forward end of the upper cover, the upper and lower covers defining a cavity therebetween,
an epicyclic slot drive mechanism including a rotatable first input element supported in the cavity for rotation about a generally upstanding first rotational axis,
a first eccentric element supported in the cavity in connection with an upper extent of the first input element for rotation thereby along a first epicyclic orbit about the first rotational axis, the first eccentric element having a generally upstanding first eccentric axis laterally offset relative to the first rotational axis,
a first pivot arm disposed in the cavity and above the first input element, the first pivot arm having a first end including a slot cooperatively receiving the first eccentric element, the first pivot arm extending forwardly to a second end comprising a pivot shaft which projects upwardly from the upper cover of the generally flat enclosure and is supported for rotation about a generally upstanding first pivotal axis therethrough, such that the first pivot arm is restrained to pivot sidewardly about the first pivotal axis by the eccentric rotation of the first concentric element, and
a first knife arm mounted on the pivot shaft above the upper cover of the generally flat enclosure and connecting to a first knife assembly of the sickle, such that the first knife assembly will be reciprocated sidewardly relative to the enclosure by the pivoting of the shaft.

8. The sickle drive of claim 7, further comprising:
a second epicyclic slot drive mechanism including a rotatable second input element supported in the cavity beside the first input element for rotation about a generally upstanding second rotational axis,
a second eccentric element supported in the cavity in connection with the second input element for rotation thereby along a second epicyclic orbit about the second rotational axis, the second eccentric element having a generally upstanding second eccentric axis laterally offset relative to the second rotational axis,
a second pivot arm disposed in the cavity and having a first end including a slot cooperatively receiving the second eccentric element, the second pivot arm extending forwardly to a second end thereof comprising a second pivot shaft which projects upwardly from the upper cover of the generally flat enclosure and is supported for rotation about a generally upstanding second pivotal axis therethrough, such that the second pivot arm is restrained to pivot sidewardly about the second pivotal axis by the eccentric rotation of the second concentric element, and a second knife arm mounted on the second pivot shaft above the upper cover of the generally flat enclosure and connecting to a second knife assembly of the sickle, such that the second knife assembly will be reciprocated sidewardly relative to the generally flat enclosure by the pivoting of the second pivot shaft.

9. The sickle drive of claim 8, wherein the first input element and the second input element are connected together for joint rotation in opposite rotational directions, for reciprocatingly moving the first and second sickle knife assemblies sidewardly simultaneously in opposite directions, such that sideward forces generated by the movements of the knife assemblies will substantially cancel each other.

10. The sickle drive of claim 9, further comprising a rotatable power source connected in rotatably driving relation to one of the first input element and the second input element, and substantially vertically coextensive with the generally flat enclosure.

11. The sickle drive of claim 10, wherein the power source comprises a motor.

12. The sickle drive of claim 11, wherein the motor is a fluid motor or an electric motor.

13. The sickle drive of claim 11, wherein the motor is oriented at an acute angle to a forward direction.

14. A header having a sickle drive for a plant cutting machine comprising:
    a first sickle knife assembly and a second sickle knife assembly each supported for side to side reciprocating movement along a forward end of the machine;
    a rotary power source that drives the first and second sickle knife assemblies; and
    a sickle drive that includes:
        a generally flat cover bounding and defining an upper portion of a generally flat cavity,
        a substantially flat first input element supported for rotation about a generally upstanding first rotational axis within the cavity,
        a substantially flat second input element supported in the cavity adjacent to the first input element for rotation about a generally upstanding second rotational axis, wherein the first and second input elements are connected so as to be rotated in opposite directions by the rotary power source, and wherein the rotary power source engages a bottom surface of one of the first and second input elements,
        a substantially flat first eccentric element extending from an upper surface of the first input element for rotation thereby in eccentric relation to the first rotational axis about a generally upstanding first eccentric axis laterally offset relative to the first rotational axis,
        a substantially flat second eccentric element extending from an upper surface of the second input element for rotation thereby in eccentric relation to the second rotational axis about a generally upstanding second eccentric axis laterally offset relative to the second rotational axis,
        a first pivot arm having a substantially flat first end and an opposite upwardly extending second end having a first pivot shaft projecting from the cavity, the first pivot arm supported for pivotal movement about the first pivotal shaft, the first end of the first pivot arm including a slot cooperatively receiving the first eccentric element, such that eccentric rotation of the first eccentric element about the first rotational axis will reciprocatingly pivot the first pivot arm,
        a second pivot arm having a substantially flat first end and an opposite upwardly extending second end having a second pivot shaft projecting from the cavity, the second pivot arm being supported for pivotal movement about the second pivot shaft, the first end of the second pivot arm including a slot cooperatively receiving the second eccentric element, such that eccentric rotation of the second eccentric element about the second rotational axis will reciprocatingly pivot the second pivot arm,
        a first knife arm mounted on the first pivot shaft completely above the cavity and the first eccentric element and connecting to the first sickle knife assembly of the sickle, such that the first knife assembly will be reciprocated sidewardly relative to the enclosure by the pivoting of the first pivot shaft, and
        a second knife arm mounted on the second pivot shaft completely above the cavity and the second eccentric element and connecting to the second knife assembly of the sickle, such that the second knife assembly will be reciprocated sidewardly relative to the enclosure by the pivoting of the second pivot shaft.

15. The header of claim 14, wherein the sickle drive is disposed completely below a floor of the header.

16. The header of claim 14, wherein the sickle drive is disposed between opposite side ends of the header.

* * * * *